2,803,537

SEPARATION OF NICKEL FROM COBALT

Marcel De Merre, Hoboken-lez-Anvers, Belgium, assignor to Société Générale Métallurgique de Hoboken, Hoboken-lez-Anvers, Belgium, a Belgian company No Drawing. Application July 21, 1955,
Serial No. 523,631

Claims priority, application Great Britain
February 14, 1955

12 Claims. (Cl. 75—119)

This invention relates to the separation of Ni from Co, both contained in solutions containing Ni and Co, and more particularly those in which the ratio Ni/Co is equal to or higher than about 0.5.

Such a separation has hitherto been carried out by various processes based upon electrolysis, or upon a preferential oxidation of Co, or upon a preferential reduction of Ni.

It is known that it is possible to precipitate heavy metals from ammoniacal solutions of heavy metal salts by the action of hydrogen or other reducing gas upon the solutions at a temperature higher than 100° C. and under a super-atmospheric pressure (see U. S. Patent No. 1,686,391).

For instance, for obtaining Ni in powder form, use may be made of total pressures of the order of 30 atmospheres or higher, and of temperatures of the order of 150° C. or higher.

The reduction of Ni precedes that of Co and it is thus possible to obtain the major part of the Ni contained in a solution in the form of a powder containing a small amount of Co, for instance in a ratio of about 1 Co to 100 Ni or less.

The precipitation of Ni in metal form is accompanied by a liberation of an amount of acid which corresponds to the amount of metal precipitated, for instance according to the formula:

$$NiSO_4 + H_2 \rightleftharpoons H_2SO_4 + Ni$$

The acid produced has a tendency to reverse the reaction; the reaction will proceed in the direction of precipitation of metallic Ni, if the formation of any excess of the free acid is avoided. In order to obtain such conditions, it is known to make use of ammoniacal complexes formed before the precipitation of Ni, or to inject ammonia into the vessel in which the reaction takes place.

The sulfuric acid liberated during the precipitation of Ni is thus converted into ammonium sulfate.

The use of the ammonia requires however, a recovery of $NH_3$ vapours; on the other side, the remaining Co solution contains $(NH_4)_2SO_4$ and cannot be used as such for the crystallisation of commercial $CoSO_4$.

It has now been found that it is possible to obtain a precipitation of metallic Ni from a mixed solution of Ni and Co, without the use of ammonia or any alkalis inside the vessel in which the reaction takes place.

The present invention consists in a process for the separation of nickel from cobalt, both contained in a primary solution of salts of a class consisting of sulfates and chlorides in a ratio Ni:Co equal to, or higher than about 0.5, which comprises introducing nickelous and cobaltous hydroxides into the primary solution of Ni–Co, subjecting the solution containing the hydroxides to a reduction process by means of a hydrogen-containing reducing gas at a temperature above normal and at super-atmospheric pressure, the amount of nickelous and cobaltous hydroxides introduced into the primary solution being such that any acid freed during the reaction which would lower the pH beyond about 2 shall be neutralized whilst the said hydroxides added are dissolved, thus precipitating, in metal form, nickel originating both from the primary solution and from the dissolved hydroxides and concentrating cobalt in the solution, and removing the precipitate of metallic nickel.

The nickelous and cobaltous hydroxides may be obtained from any mixed solution of Ni and Co but may advantageously be obtained from a portion of the primary solution to be treated. The precipitation of Ni and Co in the form of hydroxides may be effected either by means of NaOH or by means of another alkali, or by electrolysis, always in the form of nickelous and cobaltous hydroxides.

The precipitate obtained is filtered and washed before being introduced as a suspension into the primary solution of Ni/Co.

This solution containing the suspension of said hydroxides is subjected to a reduction process, for instance by means of hydrogen, inside a suitable vessel such as an autoclave, under super-atmospheric pressure, for instance 30 atmospheres.

The Ni of the solution is precipitated, thus freeing acid which is neutralized by the hydroxide in suspension:

$$2NiSO_4 + 2H_2 \rightleftharpoons 2Ni + 2H_2SO_4$$
$$2H_2SO_4 + Ni(OH)_2 + Co(OH)_2 \rightleftharpoons NiSO_4 + CoSO_4 + 4H_2O$$

The Ni which has thus been redissolved in the form of $NiSO_4$ is again precipitated by means of the reducing agent, and metallic Ni is obtained together with a solution in which cobalt becomes more and more concentrated.

The introduction of the suspension of mixed nickelous and cobaltous hydroxides into the primary Ni/Co solution may be effected all at once, before starting the Ni precipitation by means of $H_2$; the pH is thus stabilized at a value corresponding to the dissolution of nickelous and cobaltous hydroxides, that is pH=6.8 to 6.9, until all the said hydroxides have been dissolved, after which the pH falls down till it becomes equal to between 1 and 2.

The mixed nickelous and cobaltous hydroxides may also be added progressively, into the autoclave, the rate of addition being controlled by the pH value or by the H consumption, and the acidity of the solution being for instance maintained at a pH=2 to 3, ending with a pH between 1 and 2.

The ratio $$\frac{(Ni+Co) \text{ in the hydroxides introduced into the primary solution}}{(Ni+Co) \text{ in the primary solution}}$$

depends on the ratio Ni/Co of the primary solution and on the ratio Ni/Co of the hydroxides. It is chosen in such a manner that at the end of the operation, a Ni powder shall be obtained containing for instance less than 1 Co for 100 Ni, and a cobalt solution still containing a certain proportion of Ni.

For instance, if the primary solution contains 2 Ni for 1 Co, if the hydroxides used are produced from the primary solution and if the hydroxides are added all at once before starting the Ni reduction, a ratio $$\frac{(Ni+Co) \text{ in the hydroxides introduced into the primary solution}}{(Ni+Co) \text{ in the primary solution}}$$

is chosen equal to about 2.2:1. In this manner the precipitation is limited to about 80% of the Ni contained both in the solution and in the hydroxides and the Ni is obtained in the form of a commercial powder product containing about 0.8 Co/100 Ni, and the remaining Co solution contains about 35 Ni/100 Co.

If the mixed Ni/Co hydroxides are added progressively during the Ni reduction, it becomes possible to add more than about 2.2:1 of $$\frac{\text{(Ni+Co) in the hydroxides introduced into the primary solution}}{\text{(Ni+Co) in the primary solution}}$$

and in this way the yield of the reduction is improved; the cobalt content of the nickel powder and the nickel content of the remaining Co solution are decreased.

The choice between the two methods for adding the mixed Ni/Co hydroxides may entirely depend on the conditions prevailing in each case. For instance, one may wish to precipitate as much Ni as possible in respect of a certain limit of cobalt percentage left as impurity or wish to shorten as much as possible the duration of the treatment in the autoclave. Indeed, it may be advantageous to limit the operation in the autoclave (which is generally costly) to what is necessary for obtaining a solution in which the ratio Ni/Co is reduced to such a limit where the use of other methods for the separation of the Ni from the Co becomes more advantageous.

As mixed nickelous and cobaltous hydroxides, use may be made of a Co hydroxide with a low Ni content; this is advantageous in order to obtain a more concentrated cobalt solution with a smaller Ni/Co ratio; however, the process becomes thus more expensive.

The temperature during the reduction process is maintained between 130° and 230° C., preferably between 150° and 180° C.

The total pressure during the reduction process is maintained between 15 and 45 atmospheres, preferably between 25 and 35 atmospheres.

The solution obtained after the reduction of the Ni may be treated for the separation of Ni in any known manner, and more particularly by the methods described in the U. S. Patents 2,651,562 and 2,671,712 or U. S. Patent application No. 315,845 or British Patents Nos. 650,595, 655,149 and 683,679, where use is made for instance of a metal Co and/or Fe or Co/Fe alloys in the presence of an element chosen from the class consisting of S, Sb, As, Te, Se.

Such methods allow of obtaining on the one side a cobaltiferous solution practically freed from nickel, from which Co may be recovered by any known means, and on the other side a precipitate containing the nickel with some cobalt and which may be advantageously redissolved and reintroduced into the process together with the primary Ni/Co solution before the Ni precipitation in the autoclave takes place.

The advantages of the process according to the present invention are:

The apparatus is simplified when compared with those used with methods employing a solution containing ammonia and ammonia salts;

The solution remaining after Ni precipitation is free from alkali or ammonia salts; the Co content of this solution may be recovered by evaporation as commercial grade $CoSO_4$, the Ni being first separated by means of the methods described in the U. S. or British patents above mentioned;

The production of Ni powder per volume unit of autoclave is increased;

The Co concentration of the solution remaining after the Ni precipitation is increased when compared with the Co concentration of the primary solution.

*Example of carrying the process into effect.*—2.9 liters of a primary neutral solution containing 38.8 gr. Ni and 18.4 gr. Co per liter (ratio Ni/Co:2.1/1) are divided into two fractions: 1.7 liters (fraction A) and 1.2 liters (fraction B).

The fraction A is heated to about 70° C. and Ni and Co therein are precipitated by means of a solution containing 400 gr. NaOH per liter (without any oxidizing agent), which is slowly added with strong stirring, until the precipitation of Co/Ni in the form of nickelous and cobaltous hydroxides has substantially been achieved (which is checked by the colour of the supernatant solution). The precipitate of mixed hydroxides is filtered and washed. The filtrate containing about 100 gr. $Na_2SO_4$ per liter is concentrated for the recovery of pure $Na_2SO_4$ crystals.

The fraction B is mixed with the Ni/Co hydroxides obtained from the fraction A; the volume of the resulting suspension is 2 liters and it contains: 65.9 gr. Ni as nickelous hydroxides, 46.5 gr. Ni in solution, 31.3 gr. Co as cobaltous hydroxide, 22.1 gr. Co in solution.

The above suspension is introduced in one batch into an autoclave of 1 gallon capacity, the temperature is slowly raised to 140° C., whilst the air contained in the autoclave is expelled. The hydrogen is admitted at 140° C. and the heat of the reaction raises the temperature to 160° C.; during the time of reduction, the hydrogen pressure is maintained at about 25 atmospheres, the total pressure being about 30 atmospheres. The reduction process is allowed to proceed for about 1 hour, during which time the average temperature is of about 150° C.

After cooling and relaxation of the pressure, the contents of the autoclave are withdrawn and the Ni powder is separated by filtration.

The solution contains 26.5 gr. Co and 9.6 gr. Ni per liter (ratio Ni/Co=0.4/1); this solution is treated by the method described in U. S. Patent No. 2,671,712 by means of Co metal and sulfur powder, and gives a Co solution containing 0.45 Ni/100 Co which is treated for the recovery of metallic cobalt, and a mixed Ni/Co sulfide (7.5 Ni/1 Co) which is redissolved, and the resulting solution is mixed with the primary solution to be treated in the autoclave, for Ni reduction (see above).

The Ni metal powder is thoroughly washed with slightly acidified hot water and contains about 0.7 Co/100 Ni.

What I claim is:

1. A process for the separation of nickel from cobalt, both contained in a primary solution of salts of a class consisting of sulfates and chlorides, in a ratio Ni:Co higher than about 0.5, which comprises introducing nickelous and cobaltous hydroxides of Ni and Co into the primary solution of Ni–Co, subjecting the solution containing the hydroxides to a reduction process by means of a hydrogen-containing reducing gas at a temperature above normal and at super-atmospheric pressure, the amount of nickelous and cobaltous hydroxides introduced into the primary solution being such that any acid freed during the reaction which would bring the pH below 2 shall be neutralized whilst the hydroxides added are dissolved, thus precipitating in metal form nickel originating both from the primary solution and from the dissolved hydroxides and concentrating cobalt in the solution, and removing the precipitate of nickel.

2. A process as claimed in claim 1, characterized in that the ratio $$\frac{\text{(Ni+Co) in the hydroxides introduced into the primary solution}}{\text{(Ni+Co) in the primary solution}}$$

is chosen in such a manner that at the end of the operation, a Ni powder is obtained containing less than 1 Co for 100 Ni, and a cobalt solution still containing a certain proportion of Ni.

3. A process as claimed in claim 1, in which the temperature during the reduction process at super-atmospheric pressure is maintained between 130° and 250° C., preferably between 150° and 180° C.

4. A process as claimed in claim 1, in which the total pressure during the reduction process is maintained between 15 and 45 atmospheres, preferably between 25 and 35 atmospheres.

5. A process as claimed in claim 1, in which the hydroxides are progressively introduced into the primary solution in an amount which continuously neutralizes acid liberated during the reaction, and are thus dissolved in the primary solution.

6. A process as claimed in claim 1, in which the pH of the primary solution is maintained between 2 and 3 by a progressive introduction of said hydroxides.

7. A process as claimed in claim 1, in which use is made of a said mixed hydroxide poor in Ni and rich in Co.

8. A process as claimed in claim 1, in which the solution of Ni and Co salts remaining after the precipitation of the major part of the Ni under super-atmospheric pressure and temperature above normal, is treated in the presence of Co in metal form in the presence of an element chosen from the class consisting of S, Sb, As, Te, Se, in order to eliminate the Ni, and the obtained Ni sulfide containing some cobalt is redissolved and reintroduced in the process together with the primary Ni/Co solution.

9. A process as claimed in claim 1, in which the solution of Ni and Co salts remaining after the precipitation of the major part of the Ni under super-atmospheric pressure and temperature above normal, is treated in the presence of cobalt alloys in the presence of an element chosen from a class consisting of S, Sb, As, Te, Se, in order to eliminate the Ni, and the obtained Ni sulfide containing some cobalt is redissolved and reintroduced in the process together with the primary Ni/Co solution.

10. A process as claimed in claim 1, in which the solution of Ni and Co salts remaining after the precipitation of the major part of the Ni under super-atmospheric pressure and temperature above normal, is treated in the presence of cobalt and iron alloys in the presence of an element chosen from a class consisting of S, Sb, As, Te, Se, in order to eliminate the Ni, and the obtained Ni sulfide containing some cobalt is redissolved and reintroduced in the process together with the primary Ni/Co solution.

11. A process as claimed in claim 1, in which the solution of Ni and Co salts remaining after the precipitation of the major part of the Ni under super-atmospheric pressure and temperature above normal, is treated in the presence of Co and Fe in metal form in the presence of an element chosen from a class consisting of S, Sb, As, Te, Se, in order to eliminate the Ni, and the obtained Ni sulfide containing some cobalt is redissolved and reintroduced in the process together with the primary Ni/Co solution.

12. A process for the separation of nickel from cobalt, both contained in a primary solution of salts of a class consisting of sulfates and chlorides, in a ratio Ni:Co higher than about 0.5, which comprises precipitating nickelous and cobaltous hydroxides in a portion of the primary solution, separating the precipitate of nickelous and cobaltous hydroxides, introducing it into the primary solution of nickel and cobalt, subjecting the solution containing the hydroxides to a reduction process by means of a hydrogen-containing reducing gas at a temperature above normal and at super-atmospheric pressure, the amount of nickelous and cobaltous hydroxides introduced into the primary solution being such that any acid freed during the reaction which would bring the pH below 2 shall be neutralized whilst the nickelous and cobaltous hydroxides added are dissolved, thus precipitating in metal form nickel originating both from the primary solution and from the dissolved hydroxides and concentrating cobalt in the solution, and removing the precipitate of metallic nickel.

References Cited in the file of this patent
UNITED STATES PATENTS

| 1,686,391 | Muller et al. | Oct. 2, 1928 |
| 2,377,832 | Wallis et al. | June 5, 1945 |
| 2,671,712 | De Merre | Mar. 9, 1954 |